United States Patent
Uesugi et al.

(10) Patent No.: US 11,699,809 B2
(45) Date of Patent: Jul. 11, 2023

(54) SULFIDE-BASED SOLID ELECTROLYTE FOR LITHIUM SECONDARY BATTERY

(71) Applicant: Mitsui Mining & Smelting Co., Ltd., Tokyo (JP)

(72) Inventors: Hideo Uesugi, Ageo (JP); Norihiko Miyashita, Ageo (JP); Hitohiko Ide, Ageo (JP); Takahiro Ito, Ageo (JP); Takashi Chikumoto, Ageo (JP); Takashi Muranaka, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 288 days.

(21) Appl. No.: 16/309,136

(22) PCT Filed: May 16, 2017

(86) PCT No.: PCT/JP2017/018404
§ 371 (c)(1),
(2) Date: Dec. 12, 2018

(87) PCT Pub. No.: WO2018/003333
PCT Pub. Date: Jan. 4, 2018

(65) Prior Publication Data
US 2019/0312304 A1    Oct. 10, 2019

(30) Foreign Application Priority Data
Jul. 1, 2016    (JP) .................. 2016-131523

(51) Int. Cl.
*H01M 10/0562*    (2010.01)
*H01B 1/10*    (2006.01)
(Continued)

(52) U.S. Cl.
CPC .......... *H01M 10/0562* (2013.01); *H01B 1/06* (2013.01); *H01B 1/10* (2013.01);
(Continued)

(58) Field of Classification Search
None
See application file for complete search history.

(56) References Cited

U.S. PATENT DOCUMENTS 9,899,701 B2    2/2018 Miyashita et al.
2013/0177821 A1    7/2013 Tsuchida et al.
(Continued)

FOREIGN PATENT DOCUMENTS

CN    101114718 A    1/2008
CN    105518923 A    4/2016
(Continued)

*Primary Examiner* — Carmen V Lyles-Irving
(74) *Attorney, Agent, or Firm* — The Webb Law Firm

(57) ABSTRACT

Provided is a sulfide-based solid electrolyte which is capable of suppressing the generation of hydrogen sulfide caused by reaction with moisture even when in contact with dry air in a dry room or the like, and capable of maintaining lithium ion conductivity. Proposed is a sulfide-based solid electrolyte for a lithium secondary battery, wherein the surface of a compound containing lithium, phosphorus, sulfur, and halogen, and having a cubic argyrodite-type crystal structure is coated with a compound containing lithium, phosphorus, and sulfur, and having a non-argyrodite-type crystal structure.

10 Claims, 3 Drawing Sheets

(51) Int. Cl.
*H01M 10/0525* (2010.01)
*H01B 1/06* (2006.01)
*H01M 10/052* (2010.01)

(52) U.S. Cl.
CPC ..... *H01M 10/052* (2013.01); *H01M 10/0525* (2013.01); *Y02E 60/10* (2013.01); *Y02T 10/70* (2013.01)

(56) References Cited

U.S. PATENT DOCUMENTS

| | | | |
|---|---|---|---|
| 2016/0293946 A1 | 10/2016 | Ritter et al. | |
| 2017/0222257 A1 | 8/2017 | Miyashita et al. | |
| 2017/0352916 A1* | 12/2017 | Miyashita | C01B 25/14 |

FOREIGN PATENT DOCUMENTS

| | | |
|---|---|---|
| JP | 2001-250580 A | 9/2001 |
| JP | 2009-117168 A | 5/2009 |
| JP | 2010-033732 A | 2/2010 |
| JP | 2011-044249 A | 3/2011 |
| JP | 2012-043646 A | 3/2012 |
| JP | 2012-48971 A | 3/2012 |
| JP | 2013239296 A | 11/2013 |
| JP | 2016-24874 A | 2/2016 |
| WO | 2015/043889 A1 | 4/2015 |
| WO | 2016/009768 A1 | 1/2016 |
| WO | 2016/104702 A1 | 6/2016 |

* cited by examiner

[FIG. 1]
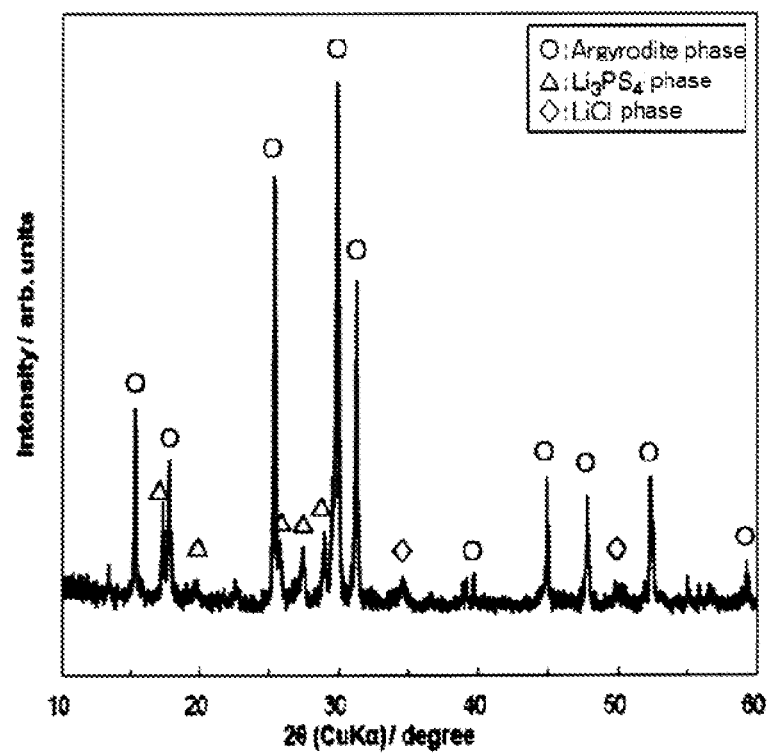

[FIG 2]
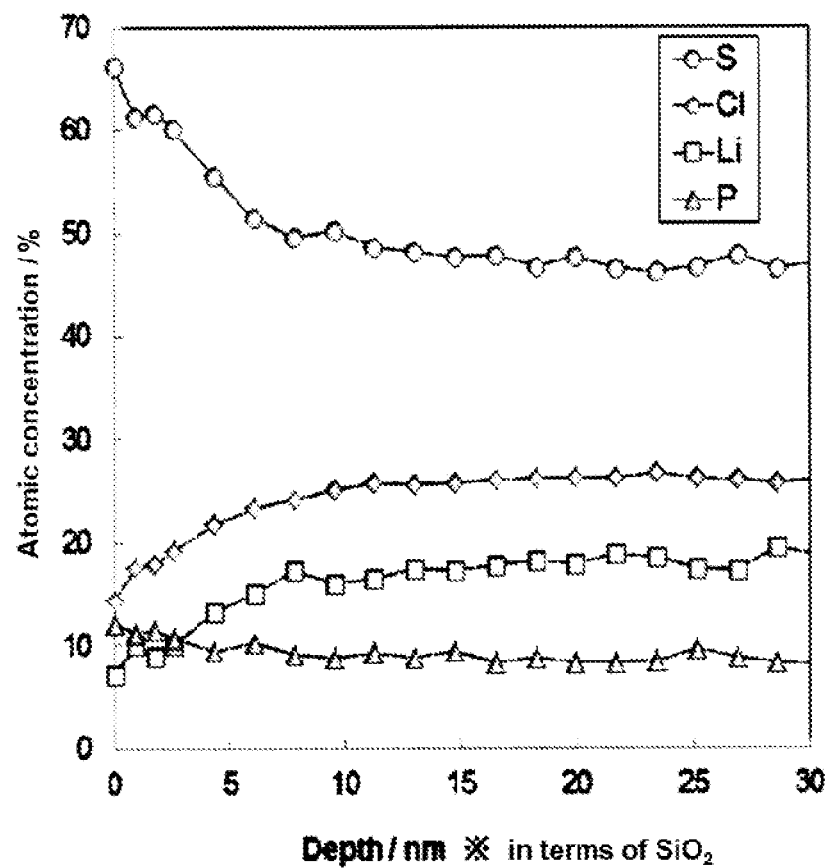

[FIG. 3]
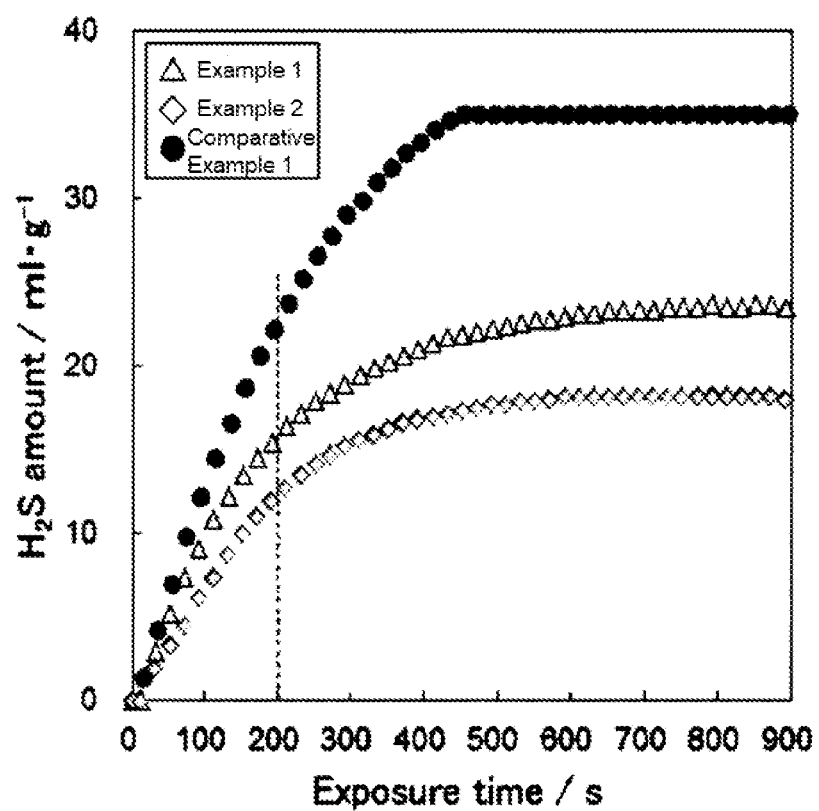

SULFIDE-BASED SOLID ELECTROLYTE FOR LITHIUM SECONDARY BATTERY

CROSS-REFERENCE TO RELATED APPLICATIONS

This application is the United States national phase of International Application No. PCT/JP2017/018404 filed May 16, 2017, and claims priority to Japanese Patent Application No. 2016-131523 filed Jul. 1, 2016, the disclosures of which are hereby incorporated in their entirety by reference.

TECHNICAL FIELD

The present invention relates to a sulfide-based solid electrolyte for a lithium secondary battery that can be suitably used as a solid electrolyte for a lithium secondary battery.

BACKGROUND ART

A lithium secondary battery is a secondary battery having a structure in which lithium dissolves out as ions from a positive electrode at the time of charging and moves to a negative electrode to be stored therein, and conversely, the lithium ions return to the positive electrode from the negative electrode at the time of discharging. Since the lithium secondary battery has characteristics such as high energy density and long service life, it is widely used as a power supply for electric appliances such as a video camera; portable electronic devices such as a laptop computer and a mobile telephone, and electric tools such as a power tool. Recently, the lithium secondary battery is also applied to a large-sized battery that is mounted in an electric vehicle (EV), a hybrid electric vehicle (HEV), and the like.

This kind of a lithium secondary battery is constituted of a positive electrode, a negative electrode, and an ion conducting layer inserted between both of the electrodes. As the ion conducting layer, a separator constituted of a porous film, such as polyethylene and polypropylene, which is filled with a non-aqueous electrolytic solution, is generally used. However, since such an organic electrolytic solution using a flammable organic solvent as a solvent is used, it is required to improve a structure and material for preventing volatilization or leakage, and also, it is required to install a safety device for suppressing an increase in temperature at the time of a short circuit and to improve the structure and material for preventing a short circuit.

In contrast, an all-solid lithium secondary battery using a sulfide-based solid electrolyte that uses lithium sulfide ($Li_2S$) or the like as a starting material, does not use a flammable organic solvent. Therefore, simplification of safety devices can be attempted, and the battery can be made as a battery which is excellent in terms of production cost and productivity. Also, it is possible to attempt high voltage by laminating the solid electrolyte in a cell in series. Furthermore, in a solid electrolyte of this kind, since nothing but lithium ions moves, side reactions caused by movement of anions do not occur, and it is expected that this leads to improvement of safety and durability.

In regard to a solid electrolyte of this kind, for example, Patent Document 1 discloses a lithium ion conductive sulfide ceramic having high lithium ion conductivity and a high decomposition voltage, wherein the sulfide ceramic contains $Li_2S$ and $P_2S_5$ as main components and has a composition in which $Li_2S$=82.5 to 92.5 and $P_2S_5$=7.5 to 17.5, as expressed in mol %, and preferably a composition (compositional formula: $Li_7PS_6$) in which $Li_2S/P_2S_5$=7 as a molar ratio.

In regard to a compound having a cubic argyrodite-type crystal structure and being represented by $Li_{7-x-2y}PS_{6-x-y}Cl_x$, Patent Document 2 discloses a new sulfide-based solid electrolyte for lithium ion batteries, wherein the solid electrolyte comprises a compound represented by a compositional formula (1): $Li_{7-x-2y}PS_{6-x-y}Cl_x$ and satisfies $0.8 \leq x \leq 1.7$ and $0 < y \leq -0.25x+0.5$ in the compositional formula.

However, a sulfide-based solid electrolyte of this kind lacks in moisture resistance, and generates a hydrogen sulfide gas caused by reaction between moisture in air and sulfur in the sulfide-based solid electrolyte, even by handling in dry air. Accordingly, the solid electrolyte has a problem in that the solid electrolyte is deteriorated, and thus the conductivity is decreased. Thus, in regard to the sulfide-based solid electrolyte containing sulfur, it has been hitherto suggested to enhance the moisture resistance.

For example, Patent Document 3 proposes a coated solid electrolyte for a lithium battery exhibiting high lithium ion conductivity and having high moisture resistance, wherein the surface of a sulfide-based solid electrolyte containing at least lithium and phosphorus is coated with a fluorine-containing silane compound or a fluorine-containing acrylic resin.

Patent Document 4 proposes a sulfide solid electrolyte material which hardly reacts with water and can lessen a generated amount of hydrogen sulfide, wherein the sulfide solid electrolyte material comprises a $PS_4$ unit-containing ion conductor containing a $PS_4$ unit and iron sulfide.

Patent Document 5 proposes a sulfide-based solid electrolyte exhibiting high lithium ion conductivity and excellent moisture resistance, wherein the sulfide-based solid electrolyte contains a lithium element, a phosphorus element, and a sulfur element, and a $Li_4P_2S_6$ structure is present on the surface of core particles having a $Li_7P_3S_{11}$ structure as a main phase.

CITATION LIST

Patent Document

Patent Document 1: Japanese Patent Laid-Open No. 2001-250580
Patent Document 2: Japanese Patent Laid-Open No. 2016-024874
Patent Document 3: Japanese Patent Laid-Open No. 2010-033732
Patent Document 4: Japanese Patent Laid-Open No. 2011-044249
Patent Document 5: Japanese Patent Laid-Open No. 2012-043646

DISCLOSURE OF INVENTION

Problem to be Solved by the Invention

The compound containing lithium, phosphorus, sulfur, and halogen, and having a cubic argyrodite-type crystal structure has extremely high reactivity with moisture, and the improvement of moisture resistance has been proposed as described above. However, the moisture resistance thereof has not been enough. Accordingly, there has been a problem in that hydrogen sulfide is generated not only in air but also in a case of bringing into contact with dry air, and the lithium ion conductivity is decreased.

Thus, the present invention is to provide a novel sulfide-based solid electrolyte which is capable of suppressing the generation of hydrogen sulfide caused by reaction between the compound and moisture, and capable of maintaining the lithium ion conductivity.

SUMMARY OF THE INVENTION

The present invention is to propose a sulfide-based solid electrolyte for a lithium secondary battery, wherein the surface of a compound containing lithium, phosphorus, sulfur, and halogen, and having a cubic argyrodite-type crystal structure is coated with a compound containing lithium, phosphorus, and sulfur, and having a non-argyrodite-type crystal structure.

In the sulfide-based solid electrolyte for a lithium secondary battery proposed by the present invention, the surface of a compound that has a cubic argyrodite-type crystal structure having extremely excellent lithium ion conductivity is coated with a compound containing lithium, phosphorus, and sulfur, and having a non-argyrodite-type crystal structure, so that the reactivity with sulfur can be suppressed. Therefore, the generation of hydrogen sulfide caused by reaction with moisture can be suppressed, and the lithium ion conductivity can be maintained. For example, the degradation can be suppressed even by bringing into contact with dry air (typically a moisture concentration of 100 ppm or less and a dew point of −45° C. or less) in a dry room or the like. Thus, it is easy to be industrially utilized, and can be suitably used as a solid electrolyte for a lithium secondary battery.

BRIEF DESCRIPTION OF DRAWINGS

FIG. 1 is an XRD spectrum of a sample obtained in Example 2;

FIG. 2 is a graph, in regard to the sample obtained in Example 2, showing a relationship between the depth (nm) and the atomic concentration (%) of the various elements, as a result of an Auger electron spectral analysis; and FIG. 3 is a graph, in regard to samples obtained in Examples 1, 2, and Comparative Example 1, obtained by measuring a generated amount of hydrogen sulfide by using a hydrogen sulfide sensor and plotting the measurement results on the coordinates of which the horizontal axis denotes the time elapsed after exposing (exposure time (s)) and the vertical axis denotes the generated amount of hydrogen sulfide ($H_2S$ amount ($ml·g^{-1}$)), as described below.

DETAILED DESCRIPTION OF THE INVENTION

Next, the present invention will be described based on embodiments. However, the present invention is not limited to the embodiments described below.

<Present Solid Electrolyte>

The sulfide-based solid electrolyte for a lithium secondary battery (referred to as "present solid electrolyte") according to one example of embodiments of the present invention is a sulfide-based solid electrolyte for a lithium secondary battery having a structure in which the surface of a compound (also referred to as "present core compound") containing lithium, phosphorus, sulfur, and halogen, and having a cubic argyrodite-type crystal structure is coated with a compound (also referred to as "present surface compound") containing lithium, phosphorus, and sulfur, and having a non-argyrodite-type crystal structure.

The present solid electrolyte is preferably a powdery particle, and in regard to the particle diameter, from the viewpoint of the ease of coating when the solid electrolyte is formed into a slurry state to produce a battery, the volume-cumulative particle diameter D50, which is measured by a laser diffraction and scattering-type particle size distribution measurement apparatus, is preferably 50 μm or less. Among others, it is more preferably 30 μm or less, and even more preferably 10 μm or less.

(Present Core Compound)

The present core compound in the present solid electrolyte is a particle of a compound containing lithium, phosphorus, sulfur, and halogen, and having a cubic argyrodite-type crystal structure.

Here, the argyrodite-type crystal structure is a crystal structure of a compound group which is derived from a mineral represented by a chemical formula: $Ag_8GeS_6$, and the present core compound is formed from a crystal structure belonging to a cubic crystal in the crystal structure.

Examples of the halogen constituting the present core compound may include one kind or a combination of two or more kinds of fluorine (F), chlorine (Cl), bromine (Br), and iodine (I). From the viewpoint of enhancing the lithium ion conductivity, chlorine (Cl) and bromine (Br) are particularly preferred.

Examples of the present core compound may include a compound represented by a compositional formula (1): $Li_{7-x-2y}PS_{6-x-y}Ha_x$ (where Ha represents halogen and is at least one kind of element of fluorine (F), chlorine (Cl), bromine (Br), and iodine (I)).

In the compositional formula (1), the parameter x, which represents a molar ratio of the halogen element, is preferably 0.4 to 1.7. When the parameter x is 0.4 to 1.7, the cubic argyrodite-type crystal structure is stable at a temperature close to room temperature, and the lithium ion conductivity can be enhanced.

From such a viewpoint, the parameter x is preferably 0.4 to 1.7, and among others, it is more preferably 0.5 or more or 1.65 or less, and even more preferably 0.6 or more or 1.6 or less. Further, as shown in Examples, it is preferable that the parameter x is 1.7 or less, since the generation of a lithium halide as a surface compound can be suppressed when producing the present solid electrolyte, and the lithium ion conductivity can be easily secured.

In addition, the parameter "y" in the compositional formula (1) is a value representing how little the $Li_2S$ component there is relative to a stoichiometric composition, and from the same viewpoint as the above, it is preferable to satisfy $-0.9 \leq y \leq -x+2$.

Among others, in order to enhance the moisture resistance, it is more preferable to satisfy $-x+0.4 \leq y$. Among others, it is even more preferable to satisfy $-x+0.9 \leq y$.

Here, even when the present core compound contains materials other than the above, such as unavoidable impurities, the content is preferably less than 5 mol % relative to the amount of the present core compound, more preferably less than 3 mol %, and even more preferably less than 1 mol %, from the viewpoint of lowering an influence on the performance.

In regard to the particle diameter of the present core compound, from the same viewpoint as the above, the volume-cumulative particle diameter D50, which is measured by a laser diffraction and scattering-type particle size distribution measurement apparatus, is preferably 50 μm or less, and among others, it is more preferably 30 μm or less, and even more preferably 10 μm or less.

(Present Surface Compound)

The present surface compound may be a compound containing lithium, phosphorus, and sulfur, and having a non-argyrodite-type crystal structure.

The present surface compound is present on the surface of the present core compound, so that the generation of hydrogen sulfide caused by reaction between the present solid electrolyte and moisture in air can be suppressed, and the lithium ion conductivity can be maintained.

The present surface compound may be present as particles, may be present as aggregated particles formed by aggregating particles, or may be present by forming a layer, on the surface of the present core compound.

Here, the "present as a layer" means a state of coating the whole surface of the present core compound. Further, the state of coating includes a gradient coating, for example, a coating in which the ratio of the present surface compound is gradually lowered from the surface of the present solid electrolyte particles to the center.

There may be areas where the present surface compound is not present on a part of area or several partial areas of the surface of the present core compound.

However, it is preferable that the present surface compound coats 20% or more of the surface area of the present core compound, more preferably 50% or more thereof, and even more preferably 80% or more thereof.

The present surface compound may be a compound having a crystal structure other than an argyrodite-type crystal structure, that is, a non-argyrodite-type crystal structure.

Examples of the non-argyrodite-type crystal structure may include an orthorhombic-type, a triclinic-type, a hexagonal-type, and the like.

It is preferable that the present surface compound constitutes a $PS_{4-R}O_R$ (R=0 or 0<R<4) unit structure in the non-argyrodite-type crystal structure. This is because the $PS_{4-R}O_R$ (R=0 or 0<R<4) unit structure is stable and hardly reacts with moisture. Examples of the compound having the $PS_{4-R}O_R$ (R=0 or 0<R<4) unit structure may include $Li_3PS_4$, $Li_4P_2S_6$, $Li_7P_3S_{11}$, a compound in which a part of S in the $PS_4$ unit structure possessed by these compounds is replaced with O, and the like.

However, it is not required for all of the sulfur components in the structure to constitute the $PS_{4-R}O_R$ (0≤R<4) unit structure, and it is preferable that 50 atom % or more of sulfur (S) contained in the present surface compound, more preferably 70 atom % or more thereof, and even more preferably 90 atom % or more thereof constitutes the $PS_{4-R}O_R$ (0≤R<4) unit structure.

The surface compound preferably contains a compound represented by $Li_3PS_{4-R}O_R$ (0≤R<4) as a main phase. Specifically, the compound is a compound represented by $Li_3PS_4$ (R=0) or a compound, in which a part of S in the $PS_4$ unit structure is replaced with O, represented by $Li_3PS_{4-R}O_R$ (0<R<4). At this time, the term "main phase" means the most contained composition in the compound in terms of molar ratio (the same applies to the following).

<Method of Producing Present Solid Electrolyte>

Next, an example of the method of producing the present solid electrolyte will be described. However, the production method explained herein is only an example for illustrative purposes, and the present invention is not intended to be limited to this method.

As an example of the preferred method of producing the present solid electrolyte, a method, in which compound particles containing lithium, phosphorus, sulfur, and halogen, and having a cubic argyrodite-type crystal structure, and a phosphorus sulfide or a phosphorus oxide, or both of these having a predetermined ratio are mixed, and heated at a predetermined condition to thereby produce the present solid electrolyte, can be cited.

By producing the present solid electrolyte as described above, a sulfide-based solid electrolyte having a structure in which the surface of the present core compound is coated with the present surface compound. At this time, a part of lithium and sulfur contained in the compound having a cubic argyrodite-type crystal structure is incorporated for forming the present surface compound, and thus the present core compound tends to have a composition having a small amount of lithium and sulfur relative to a stoichiometric composition. Thereby, a ratio of sulfur belonging to a $PS_{4-R}O_R$ unit structure in the sulfur contained in the present core compound increases, which is particularly preferred from the viewpoint of improving moisture resistance of the present core compound itself.

In the production method, a mixing ratio of the phosphorus sulfide or the phosphorus oxide, or both of these is preferably 0.1 to 42 mol in total relative to 100 mol of the present core compound, and among others, it is more preferably 30 mol or less, and even more preferably 15 mol or less from the viewpoint of achieving both the suppressing of the $H_2S$ gas generation and the maintaining of the lithium ion conductivity.

Examples of the phosphorus sulfide may include $P_2S_5$ ($P_4S_{10}$), $P_4S_3$, $P_4S_5$, $P_4S_7$, and the like. Examples of the phosphorus oxide may include $P_2O_5$ ($P_4O_{10}$), $P_4O_7$, and the like. Among others, from the viewpoint of the ease of controlling the composition, $P_2S_5$ and $P_2O_5$ are preferred.

Further, the phosphorus sulfide and the phosphorus oxide are preferably mixed by dissolving in an organic solvent, and the average particle diameter of the powder at the time of mixing is preferably 50 μm or less.

As a more specific example of the production method, a method, in which the present core compound powder serving as a base material particle such as a $Li_{5.8}PS_{4.8}Cl_{1.2}$ powder and a phosphorus sulfide ($P_2S_5$) powder are mixed in a predetermined ratio, and the mixture is heated at a predetermined condition, crushed or pulverized as necessary, and classified as necessary, can be cited.

At this time, examples of the mixing method of the raw materials may include a method of pulverizing and mixing the raw materials by using a ball mill, a beads mill, a homogenizer, and the like.

At this time, when a very strong mechanical pulverization and mixing such a mechanical alloying method is performed, the crystallinity of the raw material powders is decreased or amorphized, or the mixed raw material powder is homogenized. As a result, the chemical bonds between cations and sulfur atoms are broken, sulfur defects are generated at the time of heating, and thus electron conductivity is exhibited. Therefore, a pulverization and mixing to the extent that crystallinity of the raw material powders can be maintained is desirable. Further, the mixing can be performed by a method other than the above. For example, a method, in which a phosphorus sulfide or a phosphorus oxide, or both of these are spray-coated on the surface of the present core compound powder serving as a base material particle, can be cited.

The mixing or heating atmosphere is preferably an atmosphere under circulating an inert gas (for example, Ar or $N_2$).

In order to suppress aggregation of particles while promoting a generation reaction of the present surface compound, the heating temperature is preferably 100 to 300° C., and among others, it is more preferably 110° C. or more or 270° C. or less, even more preferably 120° C. or more or 250° C. or less.

<Applications of Present Solid Electrolyte>

The present solid electrolyte can be used as a solid electrolyte layer of an all-solid-type lithium secondary battery, or as a solid electrolyte that is mixed with a positive or negative electrode mixture.

Examples of the shape of the battery may include a laminate-type, a cylindrical-type, a square-type, and the like.

For example, an all-solid-type lithium secondary battery can be constituted by forming a layer containing the present solid electrolyte between the positive electrode and the negative electrode.

In so doing, the present solid electrolyte has excellent moisture resistance, and thus the characteristic degradation is low even by handling in dry air. Therefore, the operation of assembling the all-solid-type lithium secondary battery can be performed even in, for example, a dry room or the like.

Here, the layer containing the present solid electrolyte can be produced by, for example, a method in which a slurry composed of the present solid electrolyte, a binder, and a solvent is dropped on a substrate, and rubbed and cut with a doctor blade or the like, a method of cutting with an air knife after contacting the substrate with the slurry, and a method in which a coating film is formed by a screen printing method or the like, and the solvent is then removed via heating and drying processes. Alternatively, the layer can also be produced in such a manner that powders of the present solid electrolyte are pressed by a press or the like to produce pressed powders, and then the pressed powders are appropriately processed.

In the layer containing the present solid electrolyte, from the viewpoint of enhancing the lithium ion conductivity, the porosity is preferably 50% or less, and among others, it is more preferably 30% or less, and even more preferably 20% or less. Thus, it is preferable that the powder of the present solid electrolyte is produced by pressing at 20 MPa or more.

Here, the porosity can be calculated from true density and apparent density of the layer containing the present solid electrolyte, which are obtained by a liquid-phase method (Archimedes method), according to a relational formula described below.

Porosity=(true density−apparent density)÷true density×100

In addition, it is preferable that the thickness of the layer containing the present solid electrolyte is typically 5 to 300 μm, and among others, it is more preferably 10 μm or more or 100 μm or less.

Meanwhile, a solid electrolyte layer obtained by mixing the present solid electrolyte and the other solid electrolyte can also be used.

As for the positive electrode material, any positive electrode material that is used as a positive electrode active material for lithium secondary batteries can be used as appropriate. Examples of the positive electrode material may include a spinel-type lithium transition metal compound, a lithium metal oxide having a layered structure, and the like. By using a high-voltage system positive electrode material, improvement of the energy density can be attempted.

The positive electrode material may contain a conductive material or other materials in addition to a positive electrode active material.

Also, as for the negative electrode material, any negative electrode material that is used as a negative electrode active material for lithium secondary batteries can be used as appropriate. Since the present solid electrolyte is electrochemically stable, a carbon-based material such as artificial graphite, natural graphite, or non-graphitizing carbon (hard carbon), all of which are charged and discharged at a low potential comparable to that of lithium metal (about 0.1 V vs. $Li^+/Li$), can also be used. Accordingly, when a carbon-based material is used for the negative electrode material, the energy density of the all-solid-type lithium secondary battery can be significantly improved. In addition, silicon or tin promising as a high capacity material can also be used as an active material. In a lithium secondary battery using a general electrolytic solution, the electrolytic solution is reacted with the active material due to charging and discharging, corrosion occurs on the surface of the active material, and thus the battery characteristics are remarkably deteriorated. When the present solid electrolyte is used as an electrolyte of a lithium secondary battery and silicon or tin is used for the negative electrode, such a corrosion reaction does not occur, and thus improvement of the durability of a battery can be attempted.

The negative electrode material may also contain a conductive material or other materials in addition to a negative electrode active material.

According to the present invention, a sulfide-based solid electrolyte capable of achieving both the suppressing effect of hydrogen sulfide generation and the maintaining of the lithium ion conductivity, can be provided. By using this for a lithium secondary battery, batteries can be produced even under environments having no ultra-low dew point, such as in a dry room.

Explanation of Terms

The term "solid electrolyte" according to the present invention means any kind of material in which ions, for example, Li+, can move around while the material is in a solid state.

Furthermore, in the present invention, in the case of being described as "X to Y" (X and Y are arbitrary numbers), it includes the meaning of being "preferably greater than X" or "preferably smaller than Y" together with the meaning of being "X or more and Y or less" unless otherwise stated.

In addition, in the case of being described as "X or more" (X is an arbitrary number) or "Y or less" (Y is an arbitrary number), it also includes the intention to be "preferably greater than X" or "preferably less than Y".

EXAMPLES

Hereafter, the present invention will be described in further detail based on the examples and comparative examples described below.

<Production of Present Core Compound>

In order to adjust a composition of the compound having a cubic argyrodite-type crystal structure to $Li_{5.8}PS_{4.8}Cl_{1.2}$, a lithium sulfide ($Li_2S$) powder, a diphosphorus pentasulfide ($P_2S_5$) powder, and a lithium chloride (LiCl) powder were respectively weighed so as to be 5 g in total amount, and then pulverized and mixed with a ball mill for 15 hours. The resultant mixed powder was filled in a container made of carbon, this was heated at 300° C. for 4 hours while circulating a hydrogen sulfide gas at 1.0 l/min in a tubular electric furnace, and then further heated at 500° C. for 4 hours. The temperature rise and fall rate was set to 200° C./h.

Subsequently, the sample was crushed with a mortar, and sieved through a sieve having an aperture diameter of 53 μm to obtain a powdery sample. At this time, all of the weighing, mixing, setting into an electric furnace, taking out from the electric furnace, crushing, and sieving were performed in a glove box substituted with an Ar gas (dew point of −60° C. or lower) that was sufficiently dried, thereby obtaining a compound powder having a cubic argyrodite-type crystal structure, which was represented by $Li_{5.8}PS_{4.8}Cl_{1.2}$.

Here, a reaction formula (1) when a diphosphorus pentasulfide ($P_2S_5$) is mixed with a compound having a cubic argyrodite-type crystal structure and heated, can be represented as follows.

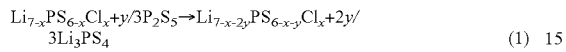
(1)

However, a small amount of LiCl may be generated in addition to that of the reaction formula (1).

Example 1

The respective powders were weighed such that the amount of $P_2S_5$ became 7 mol with respect to 100 mol of the compound powder represented by $Li_{5.8}PS_{4.8}Cl_{1.2}$. Subsequently, these were pulverized and mixed for 12 hours by using a ball mill pulverizer (beads: $ZrO_2$ having a diameter of 2 mm, the number of revolutions of 500 rpm), and then dried in vacuum for 1 hour. The resultant mixed powder was filled in a glass vial container, and this was heated at 200° C. for 2 hours in a tubular electric furnace.

Example 2

A powder sample was produced by the same method as in Example 1 except that the powders were weighed and mixed such that the amount of $P_2S_5$ became 14 mol with respect to 100 mol of the compound powder represented by $Li_{5.8}PS_{4.8}Cl_{1.2}$.

Example 3

A compound powder having a cubic argyrodite-type crystal structure and being represented by $Li_{6.4}PS_{5.4}Cl_{0.6}$ was produced in the same manner as the compound powder of $Li_{5.8}PS_{4.8}Cl_{1.2}$ except that the lithium sulfide ($Li_2S$) powder, the diphosphorus pentasulfide ($P_2S_5$) powder, and the lithium chloride (LiCl) powder were weighed and mixed so as to be $Li_{6.4}PS_{5.4}Cl_{0.6}$.

A powder sample was produced by the same method as in Example 1 except that the powders were weighed and mixed such that the amount of $P_2S_5$ became 42 mol with respect to 100 mol of the resultant compound powder represented by $Li_{6.4}PS_{5.4}Cl_{0.6}$.

Example 4

A compound powder having a cubic argyrodite-type crystal structure and being represented by $Li_{5.4}PS_{4.4}Cl_{1.6}$ was produced in the same manner as the compound powder of $Li_{5.8}PS_{4.8}Cl_{1.2}$ except that the lithium sulfide ($Li_2S$) powder, the diphosphorus pentasulfide ($P_2S_5$) powder, and the lithium chloride (LiCl) powder were weighed and mixed so as to be $Li_{5.4}PS_{4.4}Cl_{1.6}$.

A powder sample was produced by the same method as in Example 1 except that the powders were weighed and mixed such that the amount of $P_2S_5$ became 10 mol with respect to 100 mol of the resultant compound powder represented by $Li_{5.4}PS_{4.4}Cl_{1.6}$.

Example 5

A powder sample was produced by the same method as in Example 1 except that the powders were weighed and mixed such that the amount of $P_2O_5$ became 14 mol with respect to 100 mol of the compound powder represented by $Li_{5.8}PS_{4.8}Cl_{1.2}$.

Comparative Example 1

The compound powder that was represented by $Li_{5.8}PS_{4.2}Cl_{1.2}$ and used in Example 1 was produced to be used as a powder sample.

Comparative Example 2

A compound powder having a cubic argyrodite-type crystal structure and being represented by $Li_{6.4}PS_{5.4}Cl_{0.6}$ was produced in the same manner as the compound powder of $Li_{5.8}PS_{4.2}Cl_{1.2}$ except that the lithium sulfide ($Li_2S$) powder, the diphosphorus pentasulfide ($P_2S_5$) powder, and the lithium chloride (LiCl) powder were weighed and mixed so as to be $Li_{6.4}PS_{5.4}Cl_{0.6}$, and this was used as a powder sample.

Comparative Example 3

A compound powder having a cubic argyrodite-type crystal structure, which was represented by $Li_{5.2}PS_{4.2}Cl_{1.8}$, was produced in the same manner as the compound powder of $Li_{5.8}PS_{4.2}Cl_{1.2}$ except that the lithium sulfide ($Li_2S$) powder, the diphosphorus pentasulfide ($P_2S_5$) powder, and the lithium chloride (LiCl) powder were weighed and mixed so as to be $Li_{5.2}PS_{4.2}Cl_{1.8}$.

A powder sample was produced by the same method as in Example 1 except that the powders were weighed and mixed such that the amount of $P_2S_5$ became 2.5 mol with respect to 100 mol of the resultant compound powder represented by $Li_{5.2}PS_{4.2}Cl_{1.8}$.

<Identification of Generated Phase>

The powdery sample obtained in each of Examples and Comparative Examples was analyzed by an X-ray diffraction method (XRD), and as a result, a phase resulting from the present core compound represented by $Li_{7-x-2y}PS_{6-x-y}Cl_x$ and a phase resulting from the present surface compound represented by $Li_3PS_{4-R}O_R$ could be confirmed. As a representative, the analysis result of Example 2 is shown in FIG. 1.

Here, the composition analysis of the powder sample obtained in each of Examples, that is, the present solid electrolyte was performed by using an X-ray photoelectron spectroscopic method (XPS). The composition analysis in the depth direction could be performed by the combination of XPS and sputtering, and thus the compositions of the present surface compound and the present core compound could be measured.

In each of Examples, the composition analysis in the depth direction of the powder sample was performed by using a Versa Probe II that was an XPS apparatus manufactured by Ulvac-Phi, Inc. In so doing, the analysis conditions were set as follows: excited X-ray: AlKα ray (1,486.7 eV), output: 50 W, X-ray diameter: 200 μm, pass energy: 26 eV, photoelectron escape angle: 45°, and Ar ion etching (an acceleration voltage of 2 kV, a sputtering area of 2 mm×2 mm, and an etching rate of 3.2 nm/min in terms of $SiO_2$).

The results of the composition analysis in the depth direction of the powder sample obtained in Example 2 are shown in Table 1.

In Table 1, 0 to 10 minutes of the sputtering time was applied to the present surface compound and 20 to 160 minutes thereof was applied to the present core compound, and the average value of the respective compositions were calculated. As a result, it could be confirmed that the main phase of the present surface compound was $Li_3PS_4$ and the composition of the present core compound was $Li_{5.0}PS_{4.4}Cl_{1.1}$. The Cl values of the present core compound were low as compared with the values shown in Table 2. This was considered because a small amount of LiCl was generated.

TABLE 1

| Sputtering time | Atomic ratio | | | | Category of | Compositional |
|---|---|---|---|---|---|---|
| [min] | Li | P | S | Cl | compound | formula of compound |
| 0 | 3.9 | 1.0 | 3.3 | 1.2 | Present | $Li_3PS_4$ + LiCl |
| 0.33 | 4.4 | 1.0 | 3.5 | 1.4 | surface | |
| 0.66 | 4.1 | 1.0 | 3.3 | 1.2 | compound | |
| 1 | 4 | 1.0 | 3.5 | 1.3 | | |
| 3 | 4.6 | 1.0 | 3.5 | 1.0 | | |
| 5 | 3.4 | 1.0 | 3.8 | 1.0 | | |
| 10 | 4.0 | 1.0 | 3.9 | 1.0 | | |
| 20 | 4.6 | 1.0 | 4.2 | 1.1 | Present | $Li_{5.0}PS_{4.4}Cl_{1.1}$ |
| 30 | 5.3 | 1.0 | 4.5 | 1.2 | core | |
| 40 | 4.3 | 1.0 | 4.3 | 1.1 | compound | |
| 50 | 4.1 | 1.0 | 4.4 | 1.1 | | |
| 60 | 5.3 | 1.0 | 4.4 | 1.0 | | |
| 70 | 5.4 | 1.0 | 4.3 | 1.0 | | |
| 80 | 5.3 | 1.0 | 4.6 | 1.2 | | |
| 100 | 5.3 | 1.0 | 4.4 | 1.0 | | |
| 120 | 5.2 | 1.0 | 4.4 | 1.0 | | |
| 140 | 4.8 | 1.0 | 4.4 | 1.1 | | |
| 160 | 5.2 | 1.0 | 4.7 | 1.1 | | |

Furthermore, the composition analysis according to an Auger electron spectral analysis was also performed.

The composition analysis in the depth direction of the powder sample obtained in each of Examples was performed under the conditions of an Ar ion etching (an acceleration voltage of 2 kV, a sputtering area of 2×2 mm, and an etching rate of 5.4 nm/min in terms of $SiO_2$) by using a field emission-type electron gun (an acceleration voltage of 3 kV, an acceleration current of 1 nA, and a beam diameter of 63 nmφ), in a scanning-type Auger electron microscope SAM680 manufactured by Ulvac-Phi, Inc.

The results of the composition analysis in the depth direction of the powder sample obtained in Example 2, that is, the present solid electrolyte, are shown in FIG. 2.

Thereby, the difference between the compositions of the surface part and the inner part (core part) could be confirmed, and results supporting the analysis results of XRD and XPS were obtained.

<Calculation of $H_2S$ Generation Rate>

The hydrogen sulfide generation rate was calculated as follows.

At first, 5 mg of the present solid electrolyte was weighed under an Ar atmosphere, and then left to stand in a sealed container (capacity of 1,750 ml, humidified state having a humidity of 40% and a temperature of 25° C.). The inner air of the sealed container was stirred by a fan, and the generated amount of hydrogen sulfide was measured by using a hydrogen sulfide sensor. From the measurement, a graph of which the horizontal axis was the time elapsed after exposing in the sealed container (unit: s) and the vertical axis was the generated amount of hydrogen sulfide per 1 g of the present solid electrolyte (unit: $ml·g^{-1}$), was created. Graphs of Examples 1, 2, and Comparative Example 1 are shown in FIG. 3. Furthermore, a slope of the straight line connecting the origin of the graph and the point at 200 s (shown with a dotted line in FIG. 3) was calculated as the generation rate of hydrogen sulfide (unit: $ml·g^{-1}·s^{-1}$). In regard to each of Examples and Comparative Examples, the hydrogen sulfide generation rate calculated by the method is shown in Table 2.

It could be confirmed that the $H_2S$ generation rate in each of Examples was suppressed to less than $8.5 \times 10^{-2}$ $ml·g^{-1}·s^{-1}$, while the $H_2S$ generation rate in each of Comparative Examples 1 and 2 was more than $8.5 \times 10^{-2}$ $ml·g^{-1}·s^{-1}$.

<Measurement of Conductivity>

Each of the powder samples obtained in Examples and Comparative Examples was subjected to a uniaxial pressing molding in a glove box that was substituted with a sufficiently dried Ar gas (dew point of −60° C. or less), and was further subjected to a CIP (cold isostatic pressing) molding at 200 MPa with a CIP apparatus to produce a pellet having a diameter of 10 mm and a thickness of about 4 to 5 mm. Further, a carbon paste as an electrode was applied on both sides of the top and bottom of the pellet, and heat-treatment was then performed at 180° C. for 30 minutes to produce a sample for ion conductivity measurement. The ion conductivity measurement was performed under the conditions of measuring frequency of 0.1 Hz to 1 MHz at room temperature (25° C.) by an alternating current impedance method using a Solartron 1255B as an apparatus manufactured by TOYO corp. The results are shown in Table 2.

The conductivity in each of Examples was more than $1.0 \times 10^{-4}$ $S·cm^{-1}$, while the conductivity in Comparative Example 3 was less than $1.0 \times 10^{-4}$ $S·cm^{-1}$. The composition of the compound having a cubic argyrodite-type crystal structure, that is, the present core compound, which was used in Comparative Example 3, was $Li_{5.2}PS_{4.2}Cl_{1.8}$, and the Cl amount was large as compared with those of Examples. Thus, the main phase of the surface compound after being mixed with the diphosphorus pentasulfide ($P_2S_5$) powder became LiCl. It is considered that the lithium ion conductivity is decreased due to this, and thus the conductivity is decreased. Meanwhile, it is considered that when the composition of the compound having a cubic argyrodite-type crystal structure, that is, the present core compound is adjusted in the manner as in Examples, the generation of LiCl can be suppressed, and the conductivity can be maintained.

The composition of the present core compound of the powder sample obtained in each of Examples and Comparative Examples, the composition of the main phase of the present surface compound thereof, the $H_2S$ gas generation rate thereof, and the conductivity thereof are shown in Table 2. Incidentally, the composition of the present core compound shown here is a calculated value based on the reaction formula (1).

TABLE 2

| | Additive | Additive amount/ mol | Parameters x and y of present core compound $Li_{7-x-2y}PS_{5-x-y}Cl_x$ | | Composition of present core compound (all cf P - 1.0) | | | Parameter R of present surface compound $Li_3PS_{4-R}O_3$ R | Main phase of present surface compound | $H_2S$ generation rate/ $ml \cdot g^{-1} \cdot s^{-1}$ | Conductivity/ $S \cdot cm^{-1}$ |
|---|---|---|---|---|---|---|---|---|---|---|---|
| | | | x | y | Li | S | Cl | | | | |
| Example 1 | $P_2S_5$ | 7 | 1.2 | 0.21 | 5.38 | 4.59 | 1.2 | 0 | $Li_3PS_4$ | $8.0 \times 10^{-2}$ | $1.8 \times 10^{-3}$ |
| Example 2 | $P_2S_5$ | 14 | 1.2 | 0.42 | 4.96 | 4.38 | 1.2 | 0 | $Li_3PS_4$ | $6.2 \times 10^{-2}$ | $4.3 \times 10^{-4}$ |
| Example 3 | $P_2S_5$ | 42 | 0.0 | 1.23 | 3.86 | 4.14 | 0.0 | 0 | $Li_3PS_4$ | $3.1 \times 10^{-2}$ | $2.0 \times 10^{-4}$ |
| Example 4 | $P_2S_5$ | 10 | 1.6 | 0.3 | 4.8 | 4.1 | 1.6 | 0 | $Li_3PS_4$ | $3.0 \times 10^{-2}$ | $1.2 \times 10^{-4}$ |
| Example 5 | $P_2O_5$ | 14 | 1.2 | 0.21 | 5.38 | 4.59 | 1.2 | 2.5 | $Li_3PS_{1.5}SO_{2.5}$ | $6.1 \times 10^{-2}$ | $1.3 \times 10^{-4}$ |
| Comparative Example 1 | none | 0 | 1.2 | 0 | 5.80 | 4.80 | 1.2 | | none | $1.3 \times 10^{-1}$ | $2.6 \times 10^{-3}$ |
| Comparative Example 2 | none | 0 | 0.6 | 0 | 6.40 | 5.40 | 0.6 | | none | $1.5 \times 10^{-1}$ | $3.5 \times 10^{-4}$ |
| Comparative Example 3 | $P_2S_5$ | 2.5 | 1.8 | 0.08 | 5.05 | 4.13 | 1.8 | | LiCl | $1.6 \times 10^2$ | $6.3 \times 10^{-5}$ |

(Consideration)

From the results of the composition analysis by the XPS and the Auger electron spectral analysis, in regard to the powder sample obtained in each of Examples 1 to 4, it was confirmed that the surface of the compound containing lithium, phosphorus, sulfur, and halogen, and having a cubic argyrodite-type crystal structure was coated with the compound containing $Li_3PS_4$ as a main phase. In regard to Example 5, it was confirmed that the surface of the compound was coated with the compound containing $Li_3PS_{4-R}O_R$ as a main phase.

By the coating, it was confirmed that both the suppressing effect of hydrogen sulfide generation and the maintaining of the conductivity could be achieved. By constituting the present solid electrolyte as described above, it was confirmed that the present solid electrolyte was capable of being sufficiently durable in practical use as a sulfide-based solid electrolyte for a lithium secondary battery.

The invention claimed is:

1. A sulfide-based solid electrolyte for a lithium secondary battery, wherein the surface of a core compound containing lithium, phosphorus, sulfur, and halogen, and having a cubic argyrodite-type crystal structure is coated with a coating compound containing lithium, phosphorus, and sulfur, and having a non-argyrodite-type crystal structure, and wherein the core compound having a cubic argyrodite-type crystal structure is represented by a compositional formula: $Li_{7-x-2y}PS_{6-x-y}Ha_x$, where Ha represents a halogen and is at least one kind of element of fluorine (F), chlorine (Cl), bromine (Br), and iodine (I), and $0.4 \leq x \leq 1.7$ and $-0.9 \leq y \leq -x+2$ in the compositional formula.

2. The sulfide-based solid electrolyte for a lithium secondary battery according to claim 1, wherein the coating compound having a non-argyrodite-type crystal structure constitutes a $PS_{4-R}O_R$ ($0 \leq R < 4$) unit structure in the structure.

3. The sulfide-based solid electrolyte for a lithium secondary battery according to claim 1, wherein the coating compound having a non-argyrodite-type crystal structure comprises a compound represented by a compositional formula: $Li_3PS_{4-R}O_R$ ($0 \leq R < 4$) as a main phase.

4. The sulfide-based solid electrolyte for a lithium secondary battery according to claim 1, wherein the halogen is one of chlorine (Cl) or bromine (Br).

5. A lithium secondary battery comprising the sulfide-based solid electrolyte for a lithium secondary battery according to claim 1.

6. A method of producing a sulfide-based solid electrolyte for a lithium secondary battery according to claim 1, wherein a core compound containing lithium, phosphorus, sulfur, and halogen, and having a cubic argyrodite-type crystal structure, and a phosphorus sulfide or a phosphorus oxide, or both of these having a ratio of 0.1 to 42 mol in total relative to 100 mol of the core compound are mixed, and heated at a temperature of 100 to 300° C. in an inert atmosphere.

7. The sulfide-based solid electrolyte for a lithium secondary battery according to claim 2, wherein the coating compound having a non-argyrodite-type crystal structure comprises a compound represented by a compositional formula: $Li_3PS_{4-R}O_R$ ($0 \leq R < 4$) as a main phase.

8. A lithium secondary battery comprising the sulfide-based solid electrolyte for a lithium secondary battery according to claim 2.

9. A lithium secondary battery comprising the sulfide-based solid electrolyte for a lithium secondary battery according to claim 3.

10. A lithium secondary battery comprising the sulfide-based solid electrolyte for a lithium secondary battery according to claim 4.

* * * * *